(12) United States Patent
Dang et al.

(10) Patent No.: US 11,157,520 B2
(45) Date of Patent: Oct. 26, 2021

(54) UNIQUENESS LEVEL FOR ANONYMIZED DATASETS

(71) Applicant: Dataspark Pte, Ltd., Singapore (SG)

(72) Inventors: The Anh Dang, Singapore (SG); Amy Xuemei Shi-Nash, Singapore (SG)

(73) Assignee: DataSpark, Pte Ltd., Singapore (SG)

( * ) Notice: Subject to any disclaimer, the term of this patent is extended or adjusted under 35 U.S.C. 154(b) by 615 days.

(21) Appl. No.: 15/081,985

(22) Filed: Mar. 28, 2016

(65) Prior Publication Data

US 2017/0277767 A1    Sep. 28, 2017

(51) Int. Cl.
| | | |
|---|---|---|
| G06F 17/30 | (2006.01) | |
| G06F 16/28 | (2019.01) | |
| G06F 21/62 | (2013.01) | |
| H04L 29/08 | (2006.01) | |

(52) U.S. Cl.
CPC ........ *G06F 16/285* (2019.01); *G06F 21/6254* (2013.01); *H04L 67/18* (2013.01)

(58) Field of Classification Search
CPC ............ G06F 17/30598; G06F 16/285; G06F 21/6254; H04L 67/18
See application file for complete search history.

(56) References Cited

U.S. PATENT DOCUMENTS

| | | |
|---|---|---|
| 3,057,726 A | 10/1962 | Teignmouth |
| 3,102,813 A | 9/1963 | Teignmouth et al. |
| 3,984,326 A | 10/1976 | Bendel |
| 4,552,060 A | 11/1985 | Redl et al. |
| 5,906,151 A | 5/1999 | Firestone et al. |
| 6,744,383 B1 | 6/2004 | Alfred et al. |
| 6,882,930 B2 | 4/2005 | Trayford et al. |
| 7,161,497 B2 | 1/2007 | Gueziec |
| 7,221,287 B2 | 5/2007 | Gueziec et al. |
| 7,392,356 B1 * | 6/2008 | Hardman .............. G06F 3/0605 711/100 |
| 7,765,176 B2 | 7/2010 | Simmons et al. |

(Continued)

OTHER PUBLICATIONS

Sweeney, Achieving κ-Anonymity Privacy Protection Using Generalization and Suppression, International Journal on Uncertainty, Fuzziness, and Knowlege-based Systems, 10(5), 2002; 571-588.

(Continued)

*Primary Examiner* — Jared M Bibbee
(74) *Attorney, Agent, or Firm* — Krajec Patent Offices, LLC; Russell Krajec

(57) ABSTRACT

A dataset's uniqueness level may be calculated by analyzing a dataset to determine a uniqueness level. In cases where the uniqueness level may be too low for a particular purpose, meaning when the dataset may not provide enough anonymity, the dataset may be adjusted by recomputing the dataset with different resolutions of spatial data, temporal data, content data, and relationship data. By adjusting the resolution or accuracy of the data elements, the uniqueness level may thereby be adjusted. An error calculation may be determined by comparing the adjusted dataset to the original data, and the error value may represent the consistency of the data to the original data. The uniqueness level may be used as an assurance level of anonymity, which may be advertised when a dataset is sold or transferred to a third party for analysis.

20 Claims, 7 Drawing Sheets

(56) References Cited

U.S. PATENT DOCUMENTS

| | | |
|---|---|---|
| 8,046,319 B2 | 10/2011 | Satir et al. |
| 8,214,883 B2 | 7/2012 | Obasanjo et al. |
| 8,331,936 B2 | 12/2012 | Alonso-Rubio et al. |
| 8,386,495 B1 | 2/2013 | Sandler et al. |
| 8,423,494 B2 | 4/2013 | Barrett et al. |
| 8,446,842 B2 | 5/2013 | Cao et al. |
| 8,478,512 B2 | 7/2013 | Nortrup |
| 8,583,659 B1 | 11/2013 | Alexandrescu et al. |
| 8,639,756 B2 | 1/2014 | Bostrom et al. |
| 8,666,643 B2 | 3/2014 | McBride et al. |
| 8,693,458 B2 | 4/2014 | Smartt et al. |
| 8,725,796 B2 | 5/2014 | Serena |
| 8,731,835 B2 | 5/2014 | Chidlovskii et al. |
| 8,739,016 B1 | 5/2014 | Goldman et al. |
| 8,799,461 B2 | 8/2014 | Herz et al. |
| 8,805,605 B2 | 8/2014 | Cooper et al. |
| 8,819,009 B2 | 8/2014 | Wana et al. |
| 8,825,350 B1 | 9/2014 | Robinson |
| 8,849,823 B2 | 9/2014 | Gotz et al. |
| 8,868,340 B1 | 10/2014 | Rinckes et al. |
| 8,938,500 B1 | 1/2015 | Acharya |
| 9,008,933 B2 | 4/2015 | Cooper et al. |
| 9,141,656 B1 | 9/2015 | Lopyrev et al. |
| 9,165,304 B2 | 10/2015 | Weiss et al. |
| 9,195,722 B1 | 11/2015 | Liu et al. |
| 9,196,157 B2 | 11/2015 | Hardin et al. |
| 9,494,694 B1 | 11/2016 | Dong et al. |
| 9,558,245 B1* | 1/2017 | Gao ............... G06F 17/30539 |
| 9,589,303 B2 | 3/2017 | Belov et al. |
| 9,754,485 B2 | 9/2017 | Holleczek et al. |
| 2004/0030670 A1 | 2/2004 | Barton |
| 2004/0058678 A1 | 3/2004 | deTorbal |
| 2005/0114383 A1 | 5/2005 | Beringer et al. |
| 2006/0074545 A1 | 4/2006 | Kim |
| 2007/0088490 A1 | 4/2007 | Sutardja |
| 2007/0208497 A1 | 9/2007 | Downs et al. |
| 2007/0282796 A1* | 12/2007 | Evenhaim ............... G16H 50/70 |
| 2008/0004789 A1 | 1/2008 | Horvitz et al. |
| 2008/0188242 A1 | 8/2008 | Carlson et al. |
| 2009/0150362 A1* | 6/2009 | Evenhaim ............ G06F 21/6254 |
| 2009/0216704 A1 | 8/2009 | Zheng et al. |
| 2009/0248746 A1* | 10/2009 | Gebben ............ G06F 17/30575 |
| 2010/0007552 A1 | 1/2010 | Oda et al. |
| 2011/0099046 A1 | 4/2011 | Weiss et al. |
| 2011/0099047 A1 | 4/2011 | Weiss et al. |
| 2011/0099048 A1 | 4/2011 | Weiss et al. |
| 2011/0145262 A1 | 6/2011 | Jamjoom et al. |
| 2011/0176523 A1 | 7/2011 | Huang et al. |
| 2011/0310733 A1 | 12/2011 | Tzamaloukas et al. |
| 2012/0096002 A1 | 4/2012 | Sheehan et al. |
| 2012/0221231 A1 | 8/2012 | Nagata et al. |
| 2012/0226522 A1 | 9/2012 | Weiss et al. |
| 2012/0245881 A1 | 9/2012 | Takaoka |
| 2012/0266081 A1 | 10/2012 | Kao |
| 2012/0296885 A1 | 11/2012 | Gontmakher et al. |
| 2013/0059607 A1 | 3/2013 | Herz et al. |
| 2013/0066548 A1 | 3/2013 | Gruen et al. |
| 2013/0073473 A1 | 3/2013 | Heath |
| 2013/0085659 A1 | 4/2013 | Bekaert |
| 2013/0103290 A1 | 4/2013 | Hardin et al. |
| 2013/0170484 A1 | 7/2013 | Kang et al. |
| 2013/0173633 A1 | 7/2013 | Piepgrass et al. |
| 2013/0185189 A1 | 7/2013 | Stewart |
| 2013/0191325 A1 | 7/2013 | Hatami-Hanza |
| 2013/0198188 A1 | 8/2013 | Huang et al. |
| 2013/0204525 A1 | 8/2013 | Pfeifle |
| 2013/0211706 A1 | 8/2013 | MacNaughtan et al. |
| 2013/0218837 A1* | 8/2013 | Bhatnagar ......... G06F 17/30174 707/624 |
| 2013/0260791 A1 | 10/2013 | Malinovskiy et al. |
| 2014/0006553 A1* | 1/2014 | Dambayashi ........... H04L 67/10 709/217 |
| 2014/0012498 A1 | 1/2014 | Gustafson |
| 2014/0058913 A1 | 2/2014 | Hinesley et al. |
| 2014/0088865 A1 | 3/2014 | Thies et al. |
| 2014/0108308 A1 | 4/2014 | Stout et al. |
| 2014/0122043 A1 | 5/2014 | Bellamy et al. |
| 2014/0149514 A1 | 5/2014 | Ryan et al. |
| 2014/0164390 A1 | 6/2014 | Hampapur et al. |
| 2014/0189524 A1 | 7/2014 | Murarka et al. |
| 2014/0189530 A1 | 7/2014 | Anand et al. |
| 2014/0189858 A1* | 7/2014 | Chen ................. G06F 17/30289 726/22 |
| 2014/0200805 A1 | 7/2014 | Modica et al. |
| 2014/0222321 A1 | 8/2014 | Petty et al. |
| 2014/0244149 A1 | 8/2014 | Relyea et al. |
| 2014/0244752 A1 | 8/2014 | Tseng |
| 2014/0330548 A1 | 11/2014 | Appel et al. |
| 2014/0330819 A1 | 11/2014 | Raina et al. |
| 2014/0380489 A1* | 12/2014 | Hacid .................. G06F 21/6254 726/26 |
| 2015/0006247 A1 | 1/2015 | Batra et al. |
| 2015/0007249 A1* | 1/2015 | Bezzi .................. G06F 21/6254 726/1 |
| 2015/0065159 A1 | 3/2015 | Alpert et al. |
| 2015/0148068 A1 | 5/2015 | Planas et al. |
| 2015/0169895 A1* | 6/2015 | Gkoulalas-Divanis ..................... G06F 21/6227 726/26 |
| 2015/0193533 A1* | 7/2015 | Platt .................. G06F 17/30395 707/723 |
| 2015/0278375 A1 | 10/2015 | Kim et al. |
| 2015/0285651 A1 | 10/2015 | Cerecke et al. |
| 2015/0285656 A1 | 10/2015 | Verheyen et al. |
| 2015/0347624 A1* | 12/2015 | Villars .............. G06F 17/30952 705/7.29 |
| 2015/0350890 A1 | 12/2015 | Arunkumar et al. |
| 2015/0354973 A1 | 12/2015 | Wang et al. |
| 2016/0021152 A1 | 1/2016 | Maguire et al. |
| 2016/0034519 A1* | 2/2016 | Besch ............... G06F 17/30371 707/690 |
| 2016/0078365 A1 | 3/2016 | Baumard |
| 2016/0171077 A1* | 6/2016 | Ros-Giralt ........ G06F 17/30985 707/755 |
| 2016/0327397 A1 | 11/2016 | Cordova et al. |
| 2016/0371973 A1 | 12/2016 | Holleczek et al. |
| 2017/0039602 A1 | 2/2017 | Shi-Nash et al. |
| 2017/0124336 A1* | 5/2017 | Freudiger ............... G06F 16/22 |
| 2017/0171720 A1 | 6/2017 | Holleczek et al. |
| 2017/0195854 A1 | 7/2017 | Shi-Nash et al. |
| 2017/0212945 A1 | 7/2017 | Shankar et al. |
| 2017/0262653 A1 | 9/2017 | Dang et al. |
| 2017/0277767 A1 | 9/2017 | Dang et al. |
| 2017/0277907 A1 | 9/2017 | Dang et al. |

OTHER PUBLICATIONS

De Montjoye, et al., Unique in the Crowd: The Privacy Bounds of Human Mobility, nature.com/scientific reports, 3:1376, DOI: 10.1038/srep01376, published Mar. 25, 2013.

Sweeney, κ-Anonymity: A Model for Protecting Privacy, International Journal on Uncertainty, Fuzziness and Knowledge-based Systems, 10(5), 2002; 557-570.

* cited by examiner

600
DETERMINING AN
ERROR FACTOR

UNIQUENESS LEVEL FOR ANONYMIZED DATASETS

BACKGROUND

Datasets are a currency in today's information sciences. The richness and diversity of data available leads to various privacy and anonymity issues, as it can be possible to identify specific people out of otherwise very large datasets. In many cases, owners of datasets that contain private or sensitive data may make their datasets available to researchers or other parties to perform analyses. The owners of the datasets have various mechanisms to anonymize the datasets, such as attempting to remove personally identifiable data, salting the database with additional records, randomizing or otherwise anonymizing the data. However, such attempts may suffer from over-anonymizing the data, wherein the datasets may not be nearly as accurate or useful as possible, or under-anonymizing the data, wherein specific individuals may be identified within the data.

SUMMARY

A dataset's uniqueness level may be calculated by analyzing a dataset to determine a uniqueness level. In cases where the uniqueness level may be too low for a particular purpose, meaning when the dataset may not provide enough anonymity, the dataset may be adjusted by recomputing the dataset with different resolutions of spatial data, temporal data, content data, and relationship data. By adjusting the resolution or accuracy of the data elements, the uniqueness level may thereby be adjusted. An error calculation may be determined by comparing the adjusted dataset to the original data, and the error value may represent the consistency of the data to the original data. The uniqueness level may be used as an assurance level of anonymity, which may be advertised when a dataset is sold or transferred to a third party for analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Uniqueness Level for Anomymized Datasets

Figure 1:
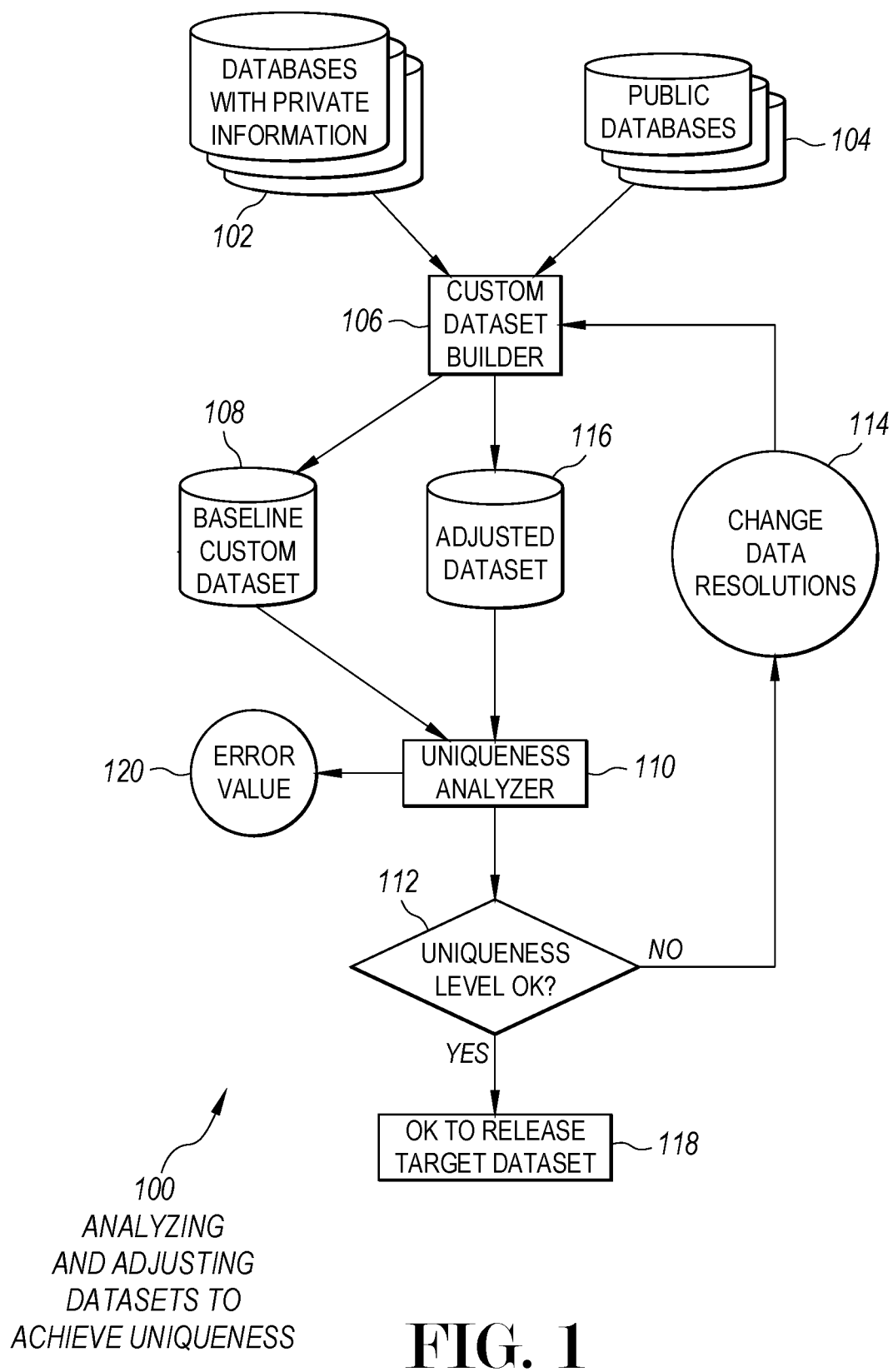
FIG. 1 is a diagram illustration of an embodiment showing a mechanism for analyzing the uniqueness of datasets.

Datasets may be characterized by a uniqueness level that may represent the amount of anonymity one can expect from the dataset derived from individual people's behaviors. The uniqueness level may be calculated from the dataset to determine the number of persons having the same patterns in the dataset. The uniqueness level may be varied when creating a dataset from raw data by changing the resolution of different factors, such as which raw data sources are used to create the dataset, spatial resolution, temporal resolution, granularity of the content, as well as relationship resolution in social graphs.

Many businesses and government organizations may have databases that may contain personally identifiable information (PII) or other data derived from individual's behavior. Such data may identify the person expressly or may be captured behavior where the person may not be precisely identified. For example, a website may collect user behavior and may track which pages they view, as well as set cookies or other tracking information on their browser. Such a dataset may track individual users without personally identifiable information, but in the case of a transaction, or when a user may give an email address, the information may then have personally identifiable information.

Some databases, such as those that communications providers may possess, may have multiple databases, each of which may have information that may be tied back to certain individuals. For example, a telecommunications company may have databases containing location information for devices within its networks, as well as call information for device to device communications and data send and receive information for communications to websites, as well as other information about user behavior. The combination of these databased may result in very precise knowledge about each user's day to day behavior, their social network and relationships between users, as well as their personal interests, political leanings, religious beliefs, and many other data points that may be inferred from the data.

While such databases could expose very personal information about each individual, such databases may be very useful for a multitude of purposes. For example, traffic engineers may wish to analyze traffic movement within a city to optimize the design of roads, improve the timing of traffic lights, or to schedule train and bus service. In another example, a marketing research firm may wish to track interest in and use of a specific product, and may wish to know the demographic profile of their users. In still another example, a healthcare researcher may wish to know the exercise patterns of various demographics. In all of these examples, there are significant advantages to analyzing the databases, however, each one of the various use cases of the databases, individual's privacy may be at risk.

The uniqueness level may be a numerical designation of the anonymity that can be expected from a dataset. In some cases, the uniqueness level may be calculated such that the higher value is more anonymous, while in other cases, the uniqueness level may be calculated such that a lower value is more anonymous. In either way, the uniqueness value may be calculated across a dataset and used to compare the relative anonymity that may be expected from a dataset.

A dataset for external use may be generated by adjusting the resolution of raw data that is placed in the dataset. In an example of a dataset with location information, the precision or resolution of the location information may be one way of anonymizing the data. If, for example, raw latitude and longitude data may be captured with six significant digits, a dataset for external use may be created from the raw data with four or five significant digits. The reduction in precision may still keep the data as accurate, but may make it more difficult for individual people's movements to be identified from the external dataset.

The combination of multiple raw datasets may make identification of specific individuals possible. For example, a database of people's movement may be scrubbed to remove people's identifiers, but such a database may be combined with a second scrubbed database of purchases made at several retailers. By combining these databases, the set of people at the time and location of a purchase may be cross referenced and individual people may be identified. The anonymity of people may be compromised by combining otherwise anonymous datasets together and cross referencing them.

Temporal resolution may be one mechanism by which raw data may be anonymized. In the example above of combining location and purchase databases, by changing the time window of the dataset from one minute resolution to one hour resolution may make the combined dataset more anonymous.

Content resolution may be another mechanism by which raw data may be anonymized. For example, a database may contain user browsing history on the Internet, which may contain specific web pages visited and the content of each of the web pages. Such raw data may be anonymized by showing different levels of content, such as by including merely the overall domain name but not the individual pages visited.

Many datasets may be combined with social or relationship graphs. The relationships graphs may be obtained through social media, express or implied interactions between people, affinities between people and brands, memberships in clubs or social groups, common employment, or other relationships. When such relationships may be combined with other datasets, it may become easy to identify specific people. A dataset having relationships may be anonymized by aggregating relationships, by only showing a limited number of relationships, or by otherwise changing the resolution of the relationships. For example, a relationship graph may be anonymized in part by showing only first generation relationships, or possibly showing only those relationships categorized as "strong" while eliminating those that are "weak", or by showing only specific types of relationships while eliminating others.

An error value may be calculated by comparing an anonymized dataset to the raw data to gage how much accuracy may have been lost during the anonymizing process. In many cases, a low error value may show that an anonymized dataset may be more accurate than one with a higher error value.

A uniqueness value and error value may have a commercial use by measuring and including a uniqueness value and sometimes an error value for a dataset that may be transferred to an entity for analysis. In many cases, a government agency, commercial group, or merely a data provider may specify a minimum uniqueness value for datasets made available, thereby ensuring that the data may be sufficiently anonymous and thereby protecting people's privacy. Such a calculation may shield the data provider from liability, for example, by analyzing their outgoing datasets for anonymity.

A dataset generator may have variables that may be tuned to generate a desired dataset from raw data. The variables may include spatial resolution, temporal resolution, data source selection, relationship resolution, or other resolution adjustments. When a dataset may be used for a specific purpose, such as traffic analysis where the location information may be of interest, the location resolution may be at a more accurate resolution than other resolutions, such as relationship, content, or, in some cases, temporal resolution.

In another use case, a data provider may not know the use of a dataset, so the data provider may check the uniqueness value of a candidate dataset, and may determine that the uniqueness value is not sufficient for an outbound dataset. The data provider may adjust the various resolutions of the various parameters to generate a new candidate dataset, then may test the second candidate to verify that it meets a desired uniqueness value. When a desired uniqueness value is achieved, the dataset may be released to a third party.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an example embodiment 100 showing how a target dataset may be generated with a target uniqueness level. Embodiment 100 is a simplified example of a sequence that may be performed by one or more computer systems.

Datasets are used for all kinds of purposes. Researchers use large datasets to uncover trends or causation, advertisers use large datasets to identify demographic information, and even traffic engineers use datasets to study movements within a subway, bus, and road system. The databases can include health related information, personal connections, bank accounts and other financial information, and a myriad of other data. These datasets can be immensely useful in an almost infinite number of uses.

Datasets can be derived from databases that may contain personally identifiable information (PII) or other sensitive information. Conventionally, these datasets may be anonymized by removing certain fields, such as names, social security numbers, account numbers, or the like. Even with the conventional anonymizing techniques applied, individual people can still be identified within a large dataset.

This problem gets exacerbated when the number of data variables increases. As databases are combined and relationships between databases are established, individual people can be identified out of the combined datasets.

Many datasets are available for purchase. These can include datasets with private information 102 and public databases 104. A custom dataset builder 106 may create datasets from various sources.

In some cases, the datasets with private information 102 may be first party datasets, where the company performing an analysis may own the database. Such a database may be the company's customer database, which may contain sensitive customer information, customer purchases, customer activity, or other data about third parties.

The custom dataset builder 106 may produce a baseline custom dataset 108. This dataset may be a dataset for internal use, or may be a dataset that may be sold or released to the public. Prior to releasing the dataset for analysis, a uniqueness analyzer 110 may process the dataset.

A uniqueness analyzer 110 may perform various analyses to mathematically determine how "unique" or "anonymized" the dataset might be. Several techniques may be used individually or in combination to determine a uniqueness value. From that analysis, a decision may be made in block 112 to determine whether or not the baseline custom dataset 108 is sufficiently unique. If it is not, the resolutions on some of the data items may be adjusted in block 114 and a second, adjusted dataset 116 may be created.

If the adjusted dataset 116 is not sufficiently unique after analysis by the uniqueness analyzer, the cycle of adjusting the data resolutions in block 114 may be repeated. When the adjusted dataset 116 is sufficiently unique, the dataset may be released in block 118.

The data resolutions are the specificity or accuracy of some of the data fields. For example, a dataset may include time-related data, which may be provided with accuracy in seconds. With such accuracy, an analyst may be able to match a customer purchase at a specific time with a person's location data at a store. If the resolution of the time-related purchase data were given in hours, rather than seconds, there may have been multiple purchases and multiple people within each hour timeframe.

Adjusting the resolution of various data fields may have the effect of creating larger buckets or groups for each field. In the example above, a time-related field originally presented in seconds may be changed to a field presented in hours. The effect may be to group the records in buckets of an hour, which may help anonymize a dataset.

The data resolutions may be adjusted for many different parameters in an effort to anonymize the dataset. These include temporal or time-related fields, spatial or location-related fields, content-based fields, relationship-based fields, or other resolutions of data fields. In general, the adjustments to a data resolution may serve to abstract the value to a higher level or more general representation of the same data.

Temporal or time-related fields may be fields that record time. Typically, such fields record date and time that an event may have occurred. Some fields may be synchronized to local time, Coordinated Universal Time (UTC), or some other time standard. In some cases, time-related fields may be a length of time that may have been measured as part of the data field, or some other time-related metric that may not directly relate to local time.

Temporal fields may have their resolutions changed by decreasing the finest precision of the values. For example, a time parameter that may be captured in milliseconds may be increased to seconds, minutes, tenths of hours, hours, days, weeks, months, years, and so forth. In some cases, time parameters may be aggregated into buckets such as weekdays and weekends, daytime or nighttime, days of the week, season, or some other aggregation scheme.

Spatial or location-related fields may capture a physical location in absolute or relative measurement. Such fields may be used to capture, for example, a person's or object's location or movements.

Spatial fields that may be defined using Global Positioning System latitude and longitude may have a resolution changed by adjusting the precision of the location data points, such as going from seven significant digits to six or five significant digits. The effects of this may be to aggregate the location to increasingly larger rectangles. Another way of aggregating spatial fields may be to classify the locations into jurisdictional boundaries, such as neighborhoods, towns, cities, countries, and the like.

Content-based fields may capture a description of any sort. In many cases, descriptions may be classified into a hierarchical structure. One example of a content-based field may be a uniform resource locator (URL) of a website. A website may have a different URL for each page of a website, and each page may have additional tags or other indicators that make up a URL for a specific point within a website. URLs may be abstracted by collapsing URL listings into higher level URLs.

Content-based fields may also be aggregated by using an external classification system, which may or may not be hierarchical. For example, patented technologies are classified into a classification databases, as well as topics that may be indexed in the Dewey Decimal System. By using such hierarchical topic structures, content-related fields may have their resolution changed.

Relationship-based fields may relate to connections between people, topics, brands, or other relationships. In an example of a social graph that may contain interactions and relationships between people, a relationship-based field may include the type of relationship between certain people, as well as characteristics that may be imputed to a person based on their relationships with other people, topics, brands, companies, locations, or other data element.

Relationship-based fields may be aggregated or have their resolutions changed by changing the scope of a search across a relationship graph, such as a social graph. For example, a person's connections may be represented by an aggregation of all first- and second-level relationships from a social graph. In another case, a relationship between two people may be a family relationship in the raw data, but may be represented as a generic type of relationship.

The data fields that may have their resolutions changed may be selected by categorizing data fields by their importance to the end uses of the dataset. For example, a data set that may be used for traffic pattern analysis through a subway station may have detailed position and time data for each person as a high priority, while other data fields may be a lower priority. If a dataset containing such data were found to be not sufficiently anonymous through its uniqueness level, the resolutions of the lower priority data fields may be adjusted wider so that the usefulness of the dataset may be preserved while making the dataset more anonymous.

An error value 120 may be generated by the uniqueness analyzer 110. The error value may be a representation of the amount of error introduced into the adjusted dataset 116. A high error value may generally represent that a large amount of error or variance may have been introduced by the reduction in resolution of certain data fields, while a low error value may generally represent that the adjusted dataset 116 may more accurately represent the raw data.

Figure 2:
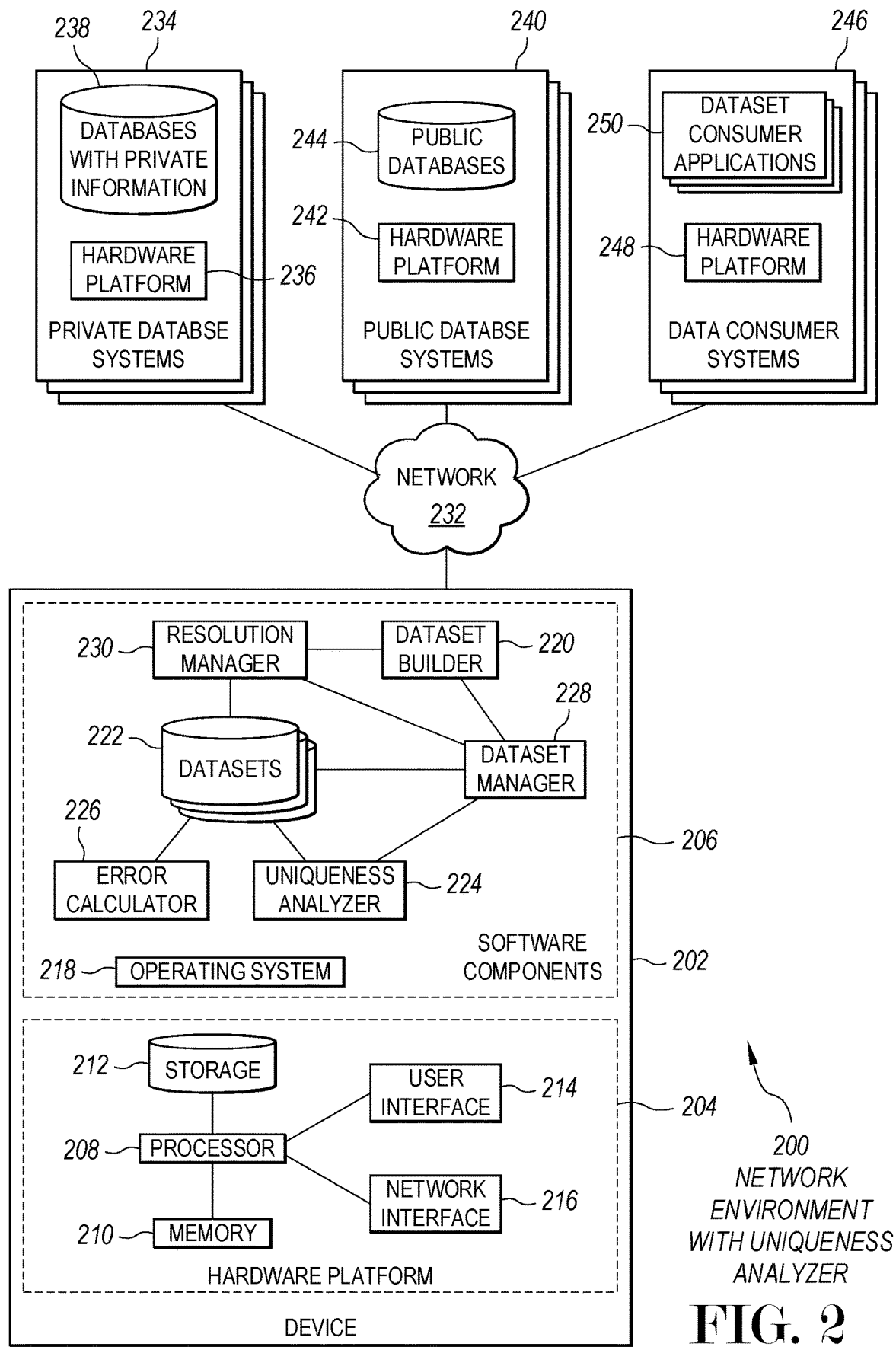
FIG. 2 is a diagram illustration of an embodiment showing a network environment with a uniqueness analyzer.

FIG. 2 is a diagram of an embodiment 200 showing components that may implement a uniqueness analyzer. Embodiment 200 is merely one example of a topology that may be used to deliver a uniqueness analyzer.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A dataset manager 228 may be one interface through which a dataset consumer may interact with the device 202. The dataset manager 228 may operate in several different modes.

In a dataset builder mode, the dataset manager 228 may receive a request for a dataset from a consumer, then cause a dataset builder 220 to create the dataset. The dataset manager 228 may then test the dataset using a uniqueness analyzer 224, and when the uniqueness value is not sufficient, may make changes to the resolution of various fields with a resolution manager 230 prior to releasing the dataset to the consumer.

In an anonymizer mode, the dataset manager 228 may receive a dataset from a source, and may evaluate the dataset using the uniqueness analyzer 224. The dataset manager 228 may use the resolution manager 230 to adjust the dataset to meet a targeted uniqueness value prior to returning the dataset. In such a mode, the dataset manager 228 may provide a dataset anonymizing service for any type of dataset.

The dataset manager 228 may have a user interface, such as a web interface, or application programming interface (API) for direct calls from another computer. In either event, the dataset manager 228 may communicate with a requesting person or computer, and may manage the flow of operations relating to datasets.

A dataset builder 220 may be a component that may create a dataset for analysis. In a typical use case, the dataset builder 220 may access multiple databases, including internal databases within a company, external but private databases available from third parties, public databases, or any other database. The dataset builder 220 may combine databases to create a dataset as requested by a user.

In a typical use case, a user may request a dataset to perform a specific type of analysis and may identify fields that may be of particular interest, along with other fields that may of secondary interest. The user may identify the sources of the data to be used, then the dataset builder 220 may access the databases, aggregate the data, and create a dataset 222.

A uniqueness analyzer 224 may analyze the dataset 222 to generate a uniqueness value. Several mathematical techniques may be used to generate a uniqueness vales, examples of which are discussed later in this specification.

When a dataset has a uniqueness value that may be outside of a desired threshold, a resolution manager 230 may adjust the resolution of certain fields in the dataset in an attempt to change the uniqueness value for the dataset. In general, changing a dataset to have less resolution or less specificity in one or more fields may cause a dataset to become more anonymous.

The resolution manager 230 may select specific fields for adjustment while not adjusting other fields. In many cases, certain fields may be higher priority for a specific dataset, and lower priority fields may be adjusted first, so that the higher priority fields may retain their usefulness to the database consumer.

An error calculator 226 may calculate an error value for a dataset. The error value may reflect the error that may have been introduced to the dataset by changes to the resolution. In most cases, a lower error level may indicate a tight correlation between the adjusted dataset and the original or raw dataset, while a higher error level may indicate more error has been introduced.

The device 202 may be connected to a network 232 by which device 202 may communicate with other systems. The network 232 may be the internet or any other communications network.

Several private database systems 234 may provide data for the dataset builder 220. These systems may operate on a hardware platform 236 and may contain databases 238 that may include private information. The private information may be simply data that the owners may sell. In some cases, the private information may also include personally identifiable information (PII), healthcare information, financial information, or other data that may be deemed private by regulation or convention.

Several public database systems 240 may provide data for the dataset building 220. These systems may operate on a hardware platform 242 and may contain databases 244 that may be publically available. Sometimes, these databases may be available through a paywall, while in other cases, these databases may be publically accessible without payment.

Data consumer systems 246 may be the end users of datasets 222. The data consumer systems 246 may operate on a hardware platform 248 and may have dataset consumer applications 250. The dataset consumer applications 250 may range from complex analysis applications that may process massive datasets to a web browser through which a user may inspect and view individual records. In some cases, the datasets 222 may be available through an application programming interface (API) while in other cases, they may be available through a web browser or download mechanism.

Figure 3:
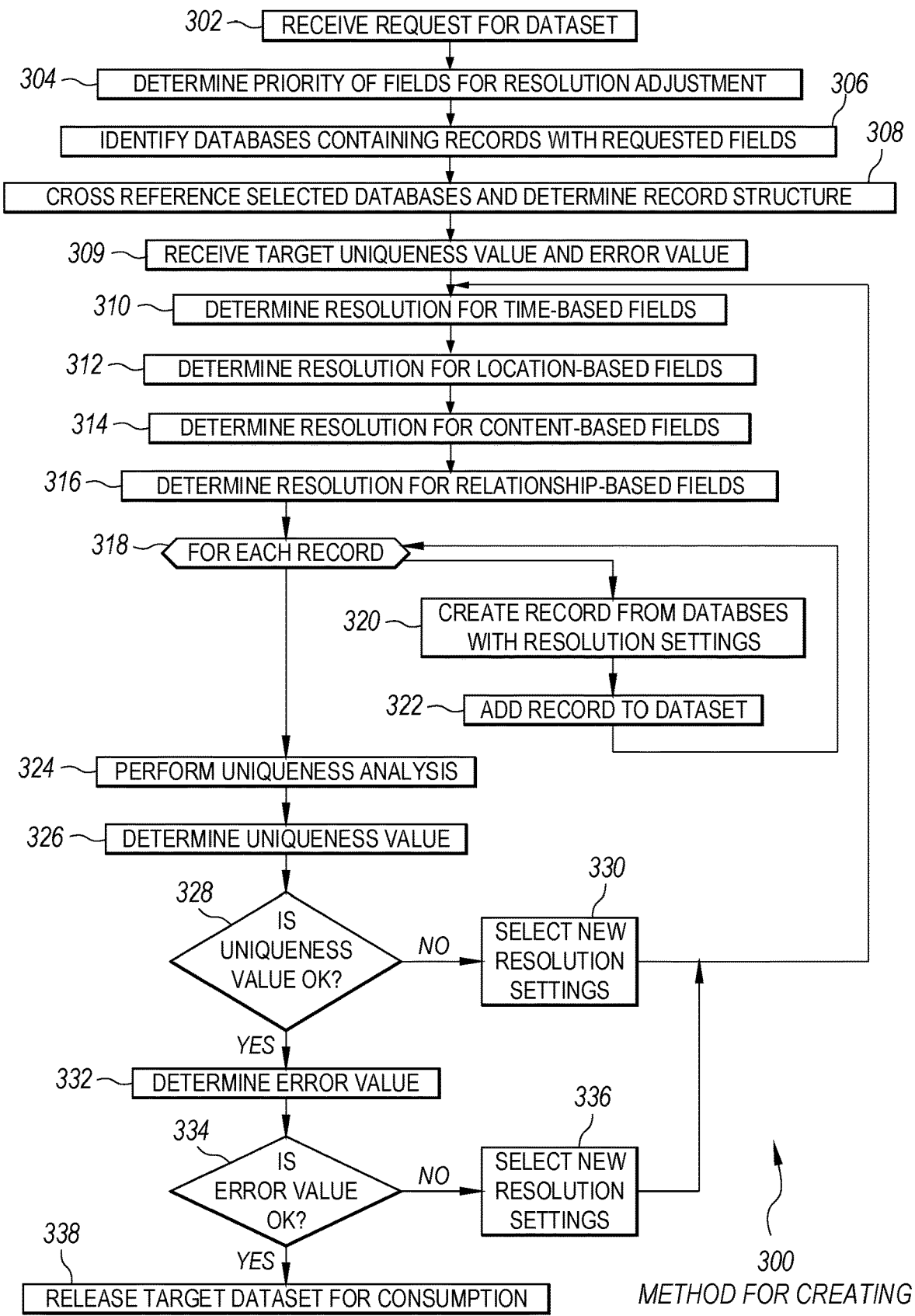
FIG. 3 is a flowchart illustration of an embodiment showing a method for analyzing datasets.

FIG. 3 is a flowchart illustration of an embodiment 300 showing a method of creating a dataset with uniqueness values. Embodiment 300 is a simplified example of a sequence for creating a dataset, then testing the dataset's uniqueness value, making changes to the resolution, and re-running the uniqueness analysis.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 300 is a simplified example of an iterative process to refine a dataset according to a uniqueness value and error value. When the uniqueness value or error values for a dataset are not OK, the resolution of various data fields are adjusted and the computation is re-run.

The example of embodiment 300 is merely one method for creating a dataset that has a target uniqueness value and error value. In the method of embodiment 300, an iterative method is shown, where the analysis may be performed multiple times and may converge on a dataset that meets the desired uniqueness and error values. In the iterative mechanism, the resolutions of the various fields may be adjusted and the dataset re-created, then analyzed again.

In some cases, the uniqueness value and error value may be used to directly determine resolution values for various fields. Such a determination may be made using heuristics, algorithms, or learnings from previous analyses. Such calculations may be used as a first pass estimate to get close, then refine the dataset using an iterative approach.

In many cases, a target uniqueness value and target error value may be specified for a dataset. The targets may be set by convention or general practice, such as setting a minimum uniqueness value for healthcare related datasets, such that the minimum number of people sharing a common profile are 5, for example. In another example, a seller of a dataset may determine that the minimum uniqueness level for any of its datasets must be 10. In still another example, a purchaser may pay a higher price for datasets with lower uniqueness values, but may pay much less for datasets with a higher uniqueness value.

A request for a dataset may be received in block 302. The request may identify the desired fields, as well as the scope of the data to be retrieved. In some cases, a requestor may be able to identify two or more databases that may have data of interest, and these databases may be combined to generate a requested dataset.

In block 304, the priority of the fields for resolution adjustment may be identified. Depending on the use case for the dataset, different fields may have a higher priority than others. For example, a dataset used to analyze foot traffic within a city may have a high priority on time and location sequences of a person's movement, but may have less priority for their demographics.

The databases containing the desired fields may be identified in block 306. The databases may be cross referenced and the record structure may be determined in block 308.

In block 309, a target uniqueness value and error value may be received. The target uniqueness value and target error value may be used to establish the first set of resolutions for fields in the following blocks, as well as serve as a values against which the calculated uniqueness and error values may be checked.

The resolution of temporal or time-based fields may be determined in block 310. The resolution of spatial or location-based fields may be determined in block 312, while the resolution of content-based fields may be determined in block 314 and the resolution of relationship-based fields may be determined in block 316. In some cases, a user may be able to manually select the resolution for each field. In other cases, a system may pre-determine a minimum resolution for some or all of the fields. The starting resolutions may or may not be the resolutions of the raw data.

During a first pass of blocks 310 through 316, the starting resolutions may be determined through various calculations designed to achieve the target uniqueness and error values. In some cases, a direct calculation may be made, while in other cases, an approximate resolution may be determined through heuristics or other mechanisms.

For each record in block 318, a record may be created in block 320 from the databases using the resolution settings. The record may be added to the dataset in block 322. When the resolution settings for various fields are different from the raw data in block 320, those fields may be aggregated or adjusted according to the resolution settings and therefore may be changed from the raw data.

A uniqueness analysis may be performed in block 324. Various methods for determining a uniqueness value are illustrated later in this specification.

If the uniqueness value is not OK in block 328, new resolution settings may be determined in block 330. In some cases, the resolution settings may be adjusted by a human, while in other cases the resolution settings may be adjusted automatically. An example of a method to adjust resolution settings is illustrated later in this specification. After adjustment, the process may loop back to block 310 and may repeat.

When the uniqueness value is OK in block 328, an error value may be determined in block 332. A method for determining an error value is illustrated later in this specification.

If the error value is not OK in block 334, the resolution settings may be adjusted in block 336 and the process may loop back to block 310.

When the error value is OK in block 334, the target dataset may be released for consumption in block 338.

Figure 4:
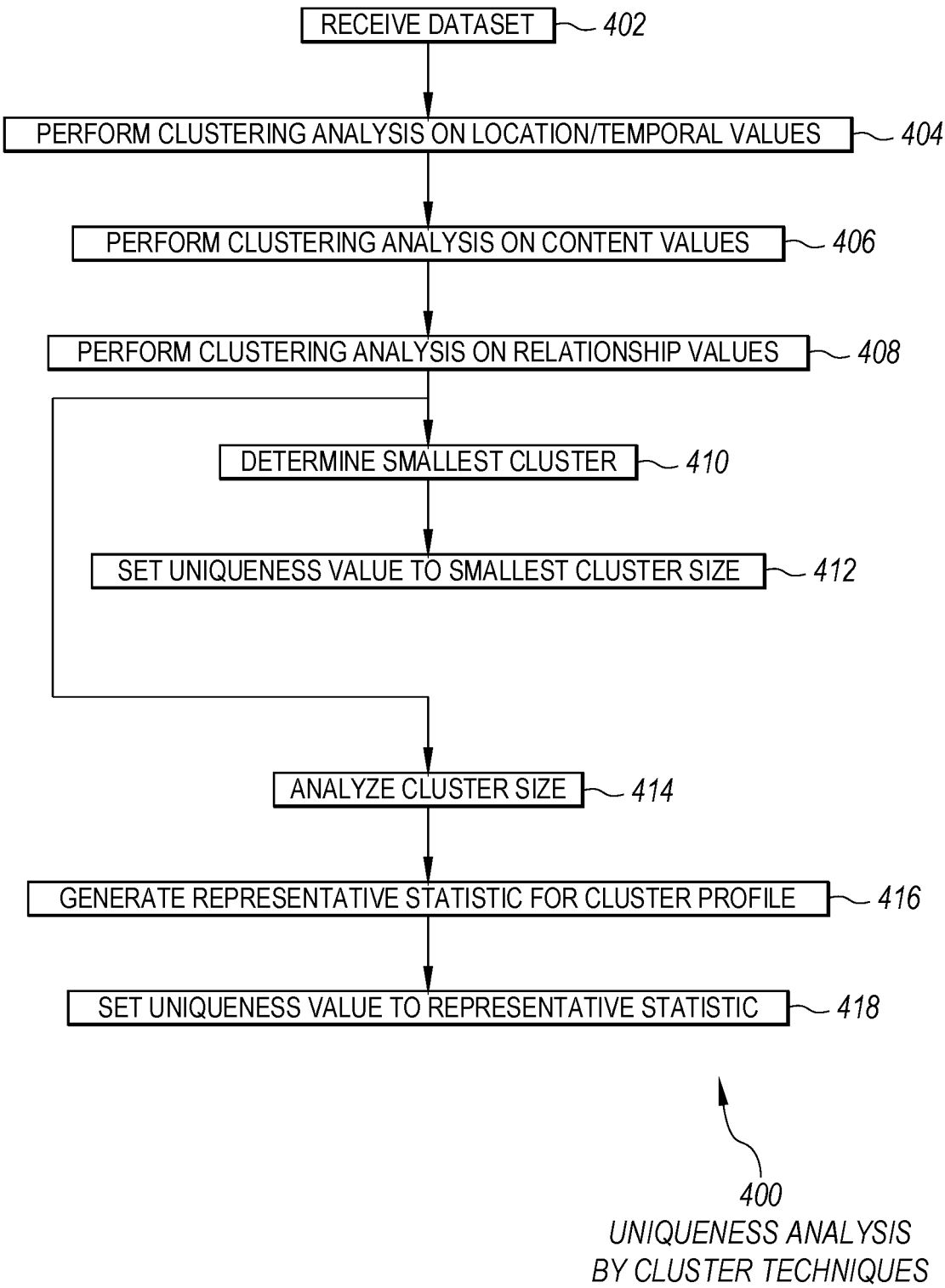
FIG. 4 is a flowchart illustration of an embodiment showing a first method for determining the uniqueness of a dataset.

FIG. 4 is a flowchart illustration of an embodiment 400 showing a first method of performing a uniqueness analysis.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 400 illustrates a simplified method of finding a uniqueness value by clustering techniques. Cluster analysis may group records together, then the smallest cluster size may be used as an indicator of the uniqueness of the dataset.

The dataset may be received in block 402.

Clustering analysis may be performed on location and temporal values in block 404, on content values in block 406, and on relationship values in block 408.

In this example embodiment, two different ways of assigning a uniqueness value are illustrated.

In the first method, the smallest cluster may be identified in block 410, and the cluster size for the smallest cluster may be used as the uniqueness value in block 412.

In the second method, the cluster sizes may be analyzed in block 414 and a representative statistic may be generated in block 416, which may be used in block 418 as the uniqueness value. The representative statistic may be any type of statistics, such as least squares, nearest neighbor, or other statistic.

Figure 5:
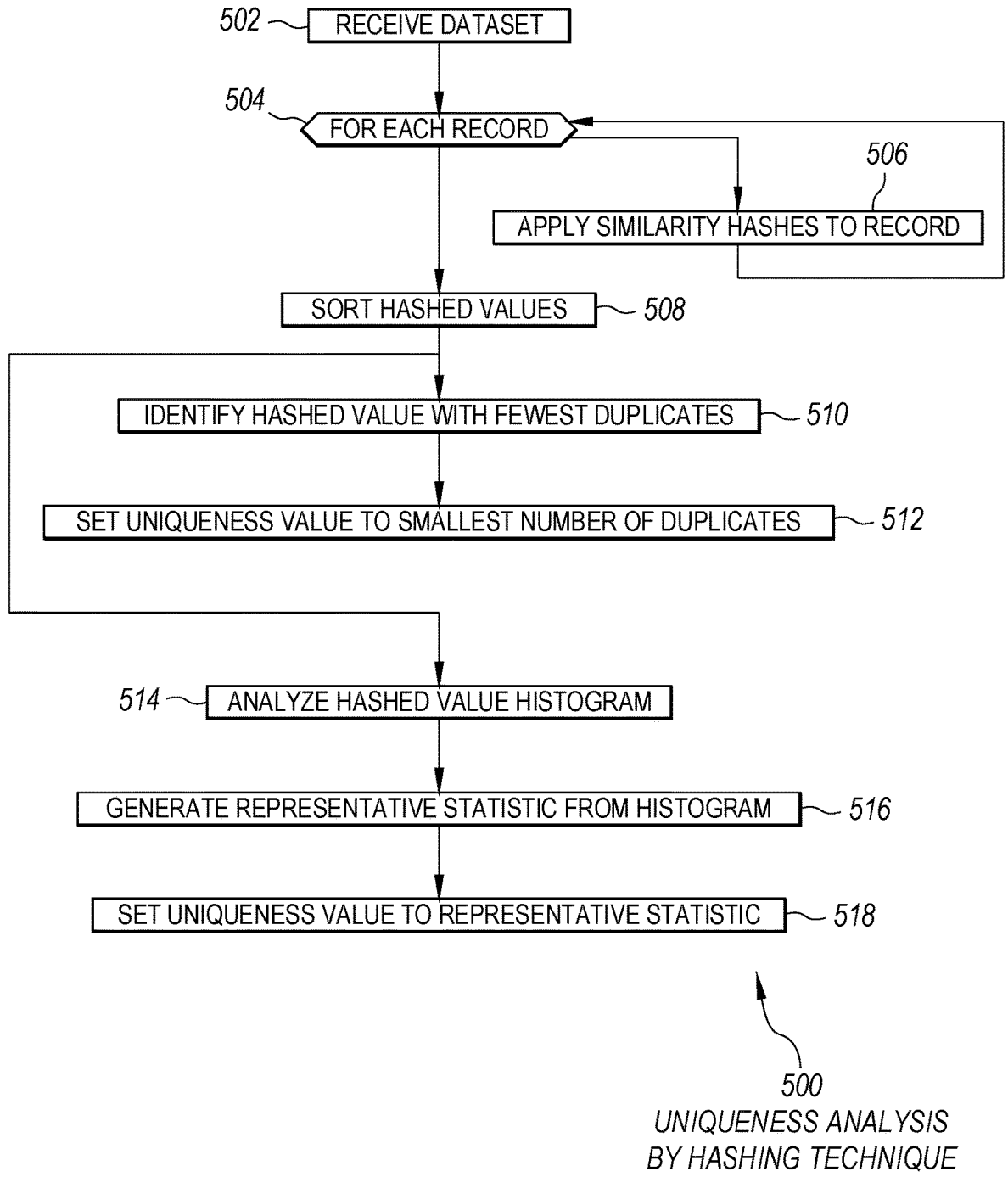
FIG. 5 is a flowchart illustration of an embodiment showing a second method for determining the uniqueness of a dataset.

FIG. 5 is a flowchart illustration of an embodiment 500 showing a second method of performing a uniqueness analysis.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 500 may illustrate a method of determining a uniqueness value by using similarity hashing techniques. One version of such a hash is a Locality Sensitive Hash (LSH), although other hashing schemes may be used.

For each record in the dataset in block 504, the hash may be applied in block 506. The hash values may be sorted in block 508.

In this example embodiment, two different ways of assigning a uniqueness value are illustrated.

In the first method, the hashed value with the fewest duplicates may be identified in block 510, and the uniqueness value may be set to the number of duplicates of the hashed value in block 512.

In the second method, a histogram of the hashed values may be analyzed in block 514 and a representative statistic may be generated in block 516, which may be used in block 518 as the uniqueness value. The representative statistic may be any type of statistics, such as least squares, nearest neighbor, or other statistic.

Figure 6:
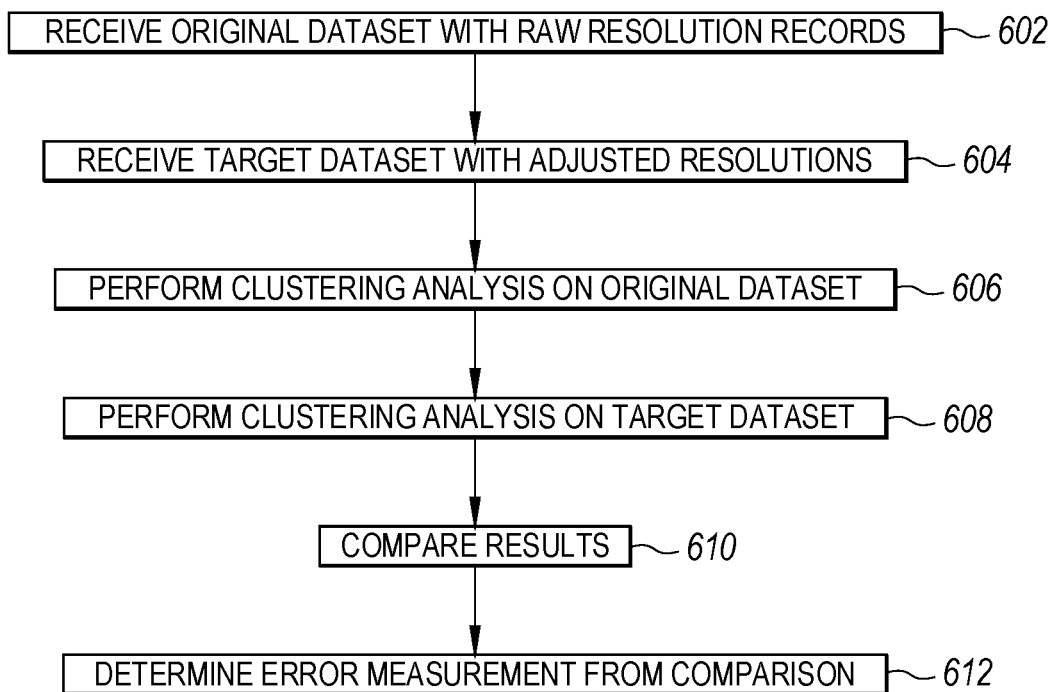
FIG. 6 is a flowchart illustration of an embodiment showing a method for determining an error factor.

FIG. 6 is a flowchart illustration of an embodiment 600 showing a method for determining an error factor.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 600 may illustrate merely one example of how to determine an error value. In this method, clustering analysis of the raw dataset and target dataset are performed and compared to generate an error value statistic.

The original dataset with raw resolution records may be received in block 602, while a target dataset with adjusted resolutions may be received in block 604. Clustering analysis may be performed on the original dataset in block 606, and on the target dataset in block 608. The results may be compared in block 610 and an error value may be determined in block 612.

Figure 7:
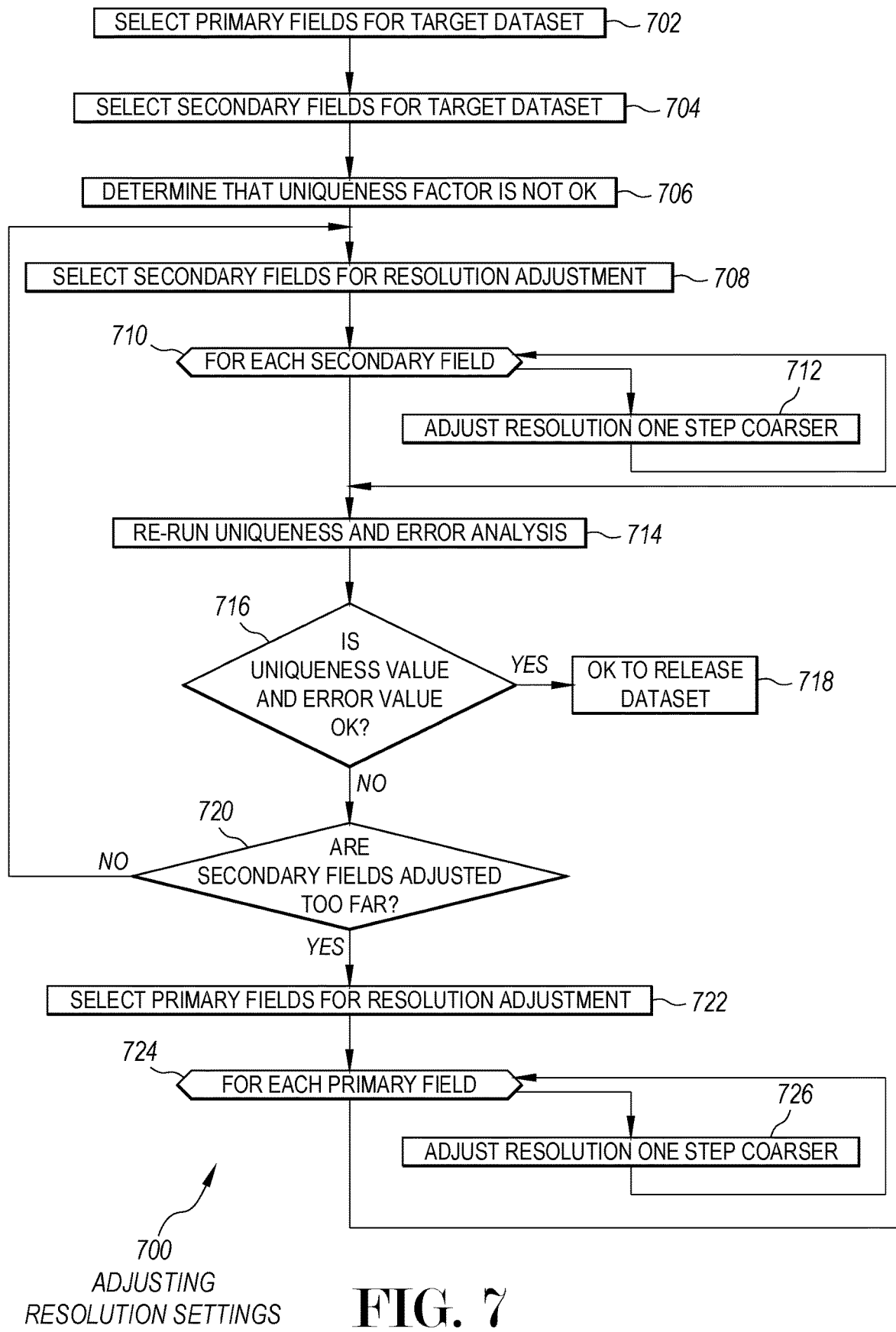
FIG. 7 is a flowchart illustration of an embodiment showing a method for adjusting resolutions for data elements.

FIG. 7 is a flowchart illustration of an embodiment 700 showing a method for adjusting resolution settings.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 700 is one method that illustrates how resolutions may be adjusted on different fields in a target database. This method, which can be automated or performed by a human, first makes adjustments to the secondary fields, then makes adjustments to primary fields when the desired uniqueness or error values have not been met.

For a given dataset, primary fields may be identified in block 702 and secondary fields may be identified in block 704. Typically, the primary fields may be those fields of particular interest by the user or consumer of the dataset, while the secondary fields may be those of less interest.

When the uniqueness factor is not OK in block 706, a set of secondary fields may be selected in block 708. For each of the selected fields in block 710, the resolution of the fields may be adjusted one step coarser in block 712.

The uniqueness analysis may be re-run in block 714. If the uniqueness value and error values are OK in block 716, the dataset may be released in block 718.

If the uniqueness value and error values are not OK in block 716, and the secondary fields are not adjusted too much in block 720, the process may loop back to block 708. In many cases, the process may iterate or loop through the secondary fields, causing those fields to become increasingly broad. If that process were to continue, those fields may become so broad as to be meaningless.

Each situation may have a different metric for determining whether or not a particular field has a resolution set to be too broad. In many cases, a human may make a decision at block 720 to approve or disapprove the change to secondary field resolutions.

When the secondary fields have been adjusted too far in block 720, some or all of the primary fields may be selected for adjustment in block 722. For each of the primary fields in block 724, the fields may be adjusted in block 726. The process may loop back to block 714 to re-run the uniqueness and error analysis.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    receiving a raw dataset comprising data records, said data records comprising data with a first resolution;
    determining a target uniqueness factor for a target dataset, said target uniqueness factor reflecting a minimum number of people identified in a smallest cluster of said data records;
    creating a first dataset from a raw dataset by an adjusting method comprising:
        for each of said data records, changing said data from said first resolution to a second resolution to create adjusted data records; and
        storing said adjusted data records in said first dataset;
    analyzing said first dataset to determine a second uniqueness factor, said second uniqueness factor representing a smallest cluster size of said data records;
    determining that said second uniqueness factor is within said target uniqueness factor; and
    using said first dataset as said target dataset.

2. The method of claim 1 further comprising:
    analyzing said raw dataset to determine a starting uniqueness factor.

3. The method of claim 2 further comprising:
    determining that said starting uniqueness factor is outside said target uniqueness factor.

4. The method of claim 1, said raw dataset comprising data from a plurality of datasets.

5. The method of claim 4 further comprising:
    receiving a first raw dataset and a second raw dataset;
    combining said first raw dataset and said second raw dataset into a linked dataset, said linked dataset having a relationship between a first data record in said first raw dataset and a second data record in said second raw dataset; and
    using said linked dataset as said raw dataset.

6. The method of claim 1, said data comprising temporal data, said first resolution and said second resolution being time-based resolutions.

7. The method of claim 1, said data comprising spatial data, said first resolution and said second resolution being location-based resolutions.

8. The method of claim 1, said data comprising content data, said first resolution and said second resolution being content-based resolutions.

9. The method of claim 1, said data comprising relationship data, said first resolution and said second resolution being relationship-based resolution.

10. The method of claim 1, said first uniqueness factor and said second uniqueness factor being determined at least in part by clustering analysis.

11. The method of claim 1, said first uniqueness factor and said second uniqueness factor being determined at least in part by hash analysis.

12. The method of claim 1 further comprising:
    determining a priority field having a first data type; and
    selecting said second resolution such that said second resolution does not affect said first data type.

13. A device comprising:
    at least one computer processor;
    said at least one computer processor configured to perform a method comprising:
        receiving a raw dataset comprising data records, said data records comprising data with a first resolution;
        determining a target uniqueness factor for a target dataset, said target uniqueness factor reflecting a minimum number of people identified in a smallest cluster of said data records;
        creating a first dataset from a raw dataset by an adjusting method comprising:
            for each of said data records, changing said data from said first resolution to a second resolution to create adjusted data records; and
            storing said adjusted data records in said first dataset;
        analyzing said first dataset to determine a second uniqueness factor, said second uniqueness factor representing a smallest cluster size of said data records;
        determining that said second uniqueness factor is within said target uniqueness factor; and
        using said first dataset as said target dataset.

14. The system of claim 13, said method further comprising:
    analyzing said raw dataset to determine a starting uniqueness factor.

15. The system of claim 14, said method further comprising:
  determining that said starting uniqueness factor is outside said target uniqueness factor.

16. The system of claim 13, said raw dataset comprising data from a plurality of datasets.

17. The system of claim 16, said method further comprising:
  receiving a first raw dataset and a second raw dataset;
  combining said first raw dataset and said second raw dataset into a linked dataset, said linked dataset having a relationship between a first data record in said first raw dataset and a second data record in said second raw dataset; and
  using said linked dataset as said raw dataset.

18. The system of claim 13, said data comprising temporal data, said first resolution and said second resolution being time-based resolutions.

19. The system of claim 13, said data comprising spatial data, said first resolution and said second resolution being location-based resolutions.

20. The system of claim 13, said data comprising content data, said first resolution and said second resolution being content-based resolutions.

\* \* \* \* \*